US011939187B2

(12) United States Patent
Studer et al.

(10) Patent No.: US 11,939,187 B2
(45) Date of Patent: Mar. 26, 2024

(54) METHOD FOR ERECTING AN ELEVATOR FACILITY

(71) Applicant: Inventio AG, Hergiswil (CH)

(72) Inventors: Christian Studer, Kriens (CH); Stefan Weber, Niederwil (CH)

(73) Assignee: INVENTIO AG, Hergiswil (CH)

( * ) Notice: Subject to any disclaimer, the term of this patent is extended or adjusted under 35 U.S.C. 154(b) by 602 days.

(21) Appl. No.: 17/250,086

(22) PCT Filed: Jun. 6, 2019

(86) PCT No.: PCT/EP2019/064824

§ 371 (c)(1),
(2) Date: Nov. 23, 2020

(87) PCT Pub. No.: WO2019/238530

PCT Pub. Date: Dec. 19, 2019

(65) Prior Publication Data

US 2021/0206602 A1 Jul. 8, 2021

(30) Foreign Application Priority Data

Jun. 14, 2018 (EP) .................................... 18177874

(51) Int. Cl.
*B66B 19/00* (2006.01)
*B66B 7/02* (2006.01)
(Continued)

(52) U.S. Cl.
CPC .............. *B66B 19/005* (2013.01); *B66B 7/02* (2013.01); *B66B 9/02* (2013.01); *B66B 19/002* (2013.01); *B66B 9/022* (2013.01); *B66B 11/0461* (2013.01)

(58) Field of Classification Search
CPC ........... B66B 19/005; B66B 7/02; B66B 9/02; B66B 19/002; B66B 9/022; B66B 11/0461
See application file for complete search history.

(56) References Cited

U.S. PATENT DOCUMENTS 5,464,072 A 11/1995 Muller
2015/0107186 A1 4/2015 Wilts et al.
(Continued)

FOREIGN PATENT DOCUMENTS

CN 1212948 A 4/1999
CN 1280952 A 1/2001
(Continued)

*Primary Examiner* — Gisele D Ford
(74) *Attorney, Agent, or Firm* — William J. Clemens; Shumaker, Loop & Kendrick, LLP

(57) ABSTRACT

An elevator installation erection method includes installing in an elevator shaft: a construction phase elevator system having a self-propelled elevator car whose usable lifting height is adapted to an increasing elevator shaft height; at least one guide rail in the elevator shaft guiding the elevator car along its travel path; and a drive system driving the elevator car and including a primary part attached to the elevator car and a secondary part attached along the elevator car travel path, wherein the guide rail and the secondary part are gradually extended upwards during the construction phase, wherein the self-propelled elevator car transports persons and/or material for the construction of the building and passengers and freight for floors already used as residential or business premises, and wherein after the elevator shaft has reached its final height the construction phase elevator system is replaced by a final elevator system.

20 Claims, 8 Drawing Sheets

(51) Int. Cl.
*B66B 9/02* (2006.01)
*B66B 11/04* (2006.01)

(56) References Cited

U.S. PATENT DOCUMENTS

| | | | |
|---|---|---|---|
| 2016/0304317 A1 | 10/2016 | Witczak et al. | |
| 2016/0311648 A1* | 10/2016 | Vaarala | G01S 17/46 |
| 2016/0311658 A1* | 10/2016 | Kilpeläinen | B66B 19/002 |
| 2018/0029832 A1 | 2/2018 | Fargo et al. | |
| 2018/0273349 A1* | 9/2018 | Weibel | B66B 7/024 |
| 2018/0327229 A1* | 11/2018 | Rocher | B66B 7/027 |
| 2019/0016563 A1* | 1/2019 | O'Keefe | B66B 9/02 |
| 2019/0112159 A1* | 4/2019 | Cambruzzi | B66B 7/027 |
| 2019/0367328 A1* | 12/2019 | Cambruzzi | B32B 37/00 |
| 2020/0055709 A1* | 2/2020 | Cambruzzi | G01B 5/25 |
| 2020/0165105 A1* | 5/2020 | Zhao | E04G 3/28 |
| 2020/0216290 A1* | 7/2020 | Luther | B66B 11/0005 |
| 2020/0277158 A1* | 9/2020 | Christen | B66B 5/284 |
| 2020/0283263 A1* | 9/2020 | Studer | B66B 1/3492 |
| 2021/0156666 A1* | 5/2021 | Cambruzzi | B66B 19/00 |

FOREIGN PATENT DOCUMENTS

| | | | |
|---|---|---|---|
| CN | 103339052 | A | 10/2013 |
| CN | 105722783 | A | 6/2016 |
| CN | 105960369 | A | 9/2016 |
| CN | 106006303 | A | 10/2016 |
| CN | 107207208 | A | 9/2017 |
| EP | 0595122 | B1 | 7/1997 |
| EP | 0826760 | A1 | 3/1998 |
| JP | H0733363 | A | 2/1995 |
| JP | H07237847 | A | 9/1995 |
| KR | 20090084587 | A | 8/2009 |

* cited by examiner

37 HOLDING BRAKE
13 FREQUENCY INVERTER
Detail X
X
4
4.1
4.1.1
5
5.1
7.1
8
30.1
32
33
34
37

37 HOLDING
BRAKE
Detail Z
30.3
8
Z
8
4
37
8
7.3
30.3
30.3
36
HYDRAULIC POWER UNIT

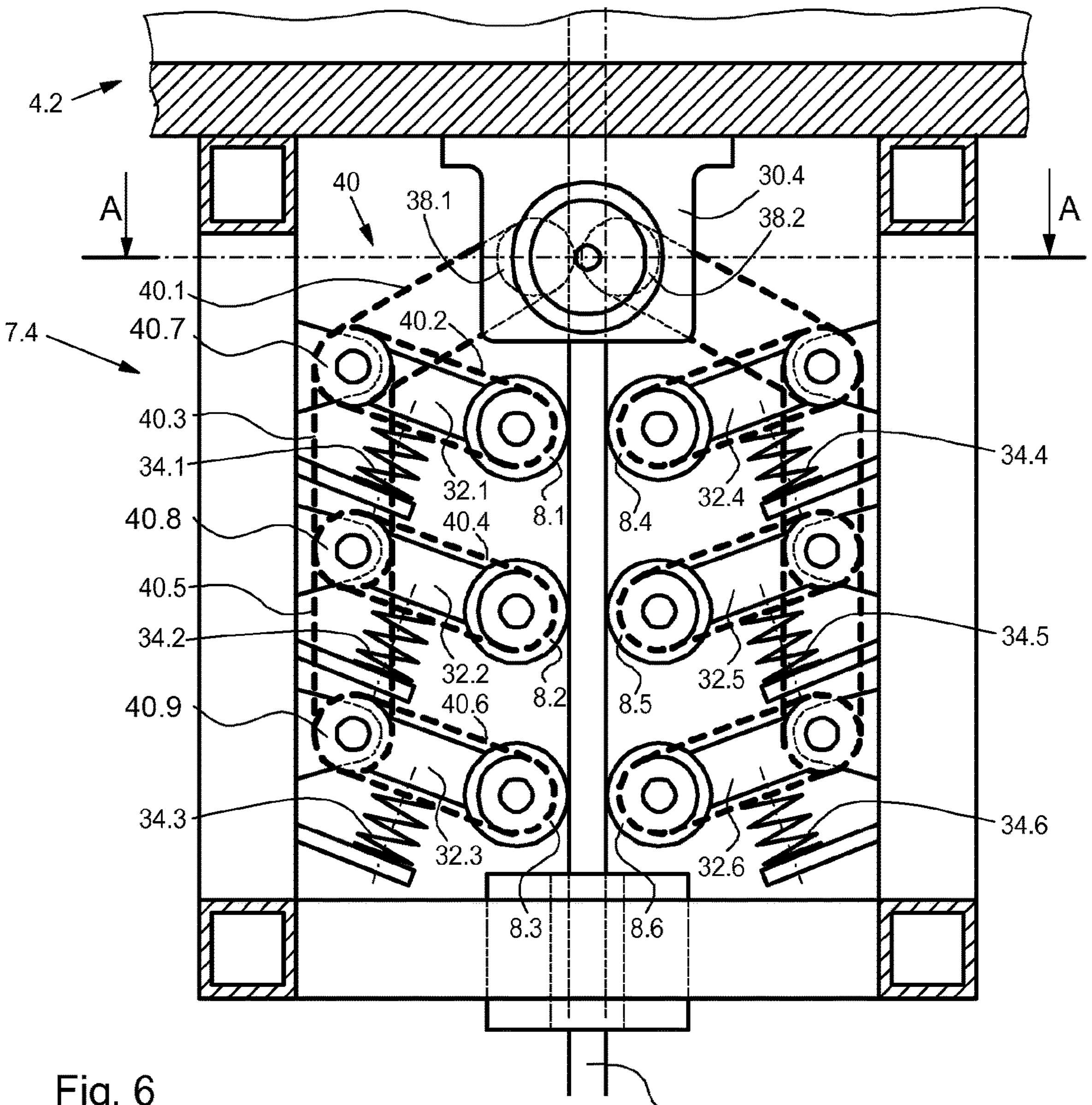
Fig. 6
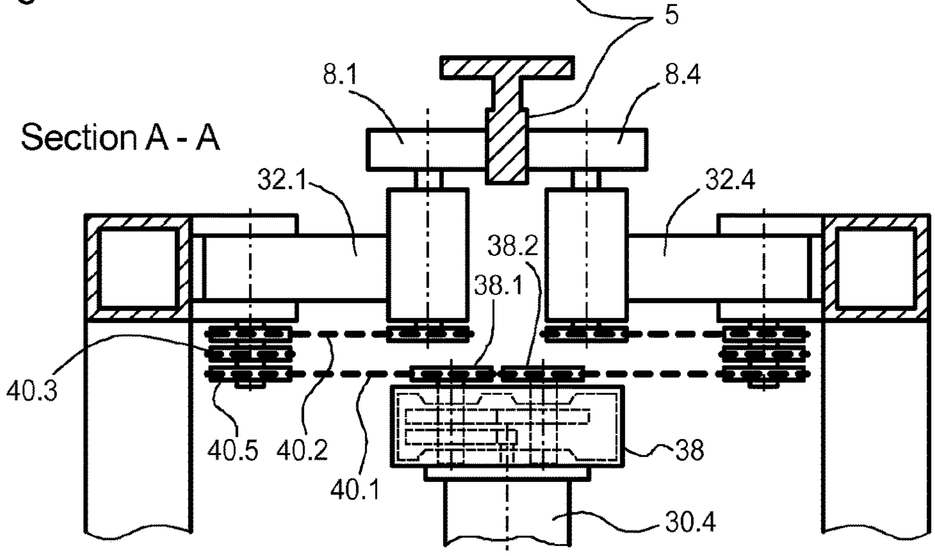

Section B - B

METHOD FOR ERECTING AN ELEVATOR FACILITY

FIELD

The invention relates to a method for erecting an elevator installation in an elevator shaft of a new building, in which method a construction phase elevator system having a self-propelled construction phase elevator car is installed in the elevator shaft, which becomes taller with the increasing building height, for the duration of the construction phase of the building, wherein the usable lifting height of the construction phase elevator car is gradually adapted to a currently present elevator shaft height.

BACKGROUND

An internal construction elevator is known from CN106006303 A, which is installed in an elevator shaft of a building that is in its construction phase. The installation of this elevator takes place synchronously with the erection of the building, i.e. the usable lifting height of the internal construction elevator grows with the increasing height of the building or elevator shaft. Such an adaptation of the usable lifting height serves, on the one hand, to transport construction specialists and construction material to the current top part of the building during the construction progress and, on the other hand, such an elevator can be used as a passenger and freight elevator for floors already used as residential or business premises during the construction phase of the building.

In order to be able to easily realize an increasing usable lifting height of the elevator, its elevator car is configured as a self-propelled elevator car, which is moved up and down by a drive system, which comprises a rack strand and a pinion attached to the elevator car and interacting with the rack strand. A guide system for the elevator car, the length of which can be adjusted to the current elevator shaft height, is installed along the elevator shaft, and the rack strand is fixed to this guide system parallel to its guide direction having a length that can also be adjusted to the current elevator shaft height. The pinion interacting with the said rack strand for driving the elevator car is fastened on the output shaft of a drive unit arranged on the elevator car. The energy supply to the drive unit is carried out via an electrical conductor line.

The indoor construction elevator described in CN106006303 A having backpack guide and rack gear drive is not suitable as an elevator with high travel speed. However, high travel speeds of e.g. at least 3 m/s are necessary for final elevator systems in buildings the building height of which justifies the installation of a construction phase elevator system, the usable lifting height of which can be adapted to an increasing height of the elevator shaft during the construction phase of the building.

SUMMARY

The invention is based on the task of creating a method of the type described at the beginning, with the application of which the disadvantages of the internal construction elevator, mentioned as the state of the art, can be avoided. In particular, the method is intended to solve the problem that the travel speed that can be achieved by the internal construction elevator is not sufficient to serve as a normal passenger and goods elevator after completion of a high building.

The problem is solved by a method of the type described above, in which for the duration of the construction phase of the building a construction phase elevator system is installed in the elevator shaft, which becomes higher with the increasing height of the building, which system comprises a self-propelled construction phase elevator car whose usable lifting height can be adapted to an increasing elevator shaft height, wherein at least one guide rail strand is installed to guide the construction phase elevator car along its travel path in the elevator shaft, wherein for driving the construction phase elevator car a drive system is mounted which comprises a primary part attached to the construction phase elevator car and a secondary part attached along the travel path of the construction phase elevator car, wherein the guide rail strand and the secondary part of the drive system are gradually extended upwards during the construction phase correspondingly with the increasing elevator shaft height, wherein the self-propelled construction phase elevator car is used both for transporting persons and/or material for the construction of the building and as a passenger and freight elevator for floors already utilized as residential or business premises during the construction phase of the building, and wherein, after the elevator shaft has reached its final height, instead of the construction phase elevator system, a final elevator system is installed in the elevator shaft which is modified compared to the construction phase elevator system.

The advantages of the method according to the invention can be seen in particular in the fact that, on the one hand, during the construction phase, an elevator optimal for this phase is available, with which the already constructed floors are attainable without repeated lifting of a movable machine room, in order to transport construction specialists, construction material and residents of already created lower floors, and that, on the other hand, after the elevator shaft has reached its final height, a final elevator system especially suitable for the building regarding travel speed can be used. Possible modifications may consist, for example, in that a drive motor and/or associated rotational speed regulating device with higher power is used, transmission ratios in drive components or diameters of traction sheaves or friction wheels are changed, elevator cars with reduced weight or other dimensions and equipment are installed, or a counterweight is integrated into the final elevator system.

In one of the possible configurations of the method according to the invention, instead of the construction phase elevator system, a final elevator system is installed in the elevator shaft, in which a drive system of an elevator car is modified compared to the drive system of the construction phase elevator car. With a modification of the drive system of the elevator car of the final elevator system, at least the necessary high travel speed of the elevator car of the final elevator system can be achieved. Examples of possible modifications of the elevator system include an increase in the drive power of the drive motor and the related speed regulating device, the change of transmission ratios of drive components, the use of a different type of drive, for example a type of drive not suitable for a self-propelled elevator car, etc.

In a further possible configuration of the procedure according to the invention, the drive system of the elevator car of the final elevator system is based on a different operating principle than the drive system of the construction phase elevator car. Since the final elevator system and thus the related drive system do not have to meet the requirement of being adaptable to an increasing building height, the application of a drive system based on a different operating principle allows an optimal adaptation of the final elevator system to requirements concerning driving speed, travel performance and driving comfort. In the present context, the term “operating principle” refers to the type of generation of a force for lifting an elevator car and its transfer to the elevator car. Preferred drive systems having an operating principle different from that of the self-propelled construction phase elevator car are drives having flexible suspension means—such as wire ropes or belts—which support and drive the elevator car of a final elevator system in various arrangement variants of the driving engine and suspension means. In general, however, all drive systems—including, for example, electric linear motor drives, hydraulic drives, recirculating ball screw drives, etc.—can be used whose operating principle differs from the operating principle of the drive system of the self-propelled construction phase elevator car, and which are suitable for relatively large lifting heights and can generate sufficiently high driving speeds of the elevator car.

In a further possible configuration of the method according to the invention, a final elevator car of the final elevator system is guided on the same at least one guide rail strand on which the construction phase elevator car was guided. This avoids the large amount of work, the high costs and, in particular, the long interruption period of elevator operation for replacing at least one guide rail strand.

In another possible configuration of the procedure according to the invention, the construction phase elevator car is used during the construction phase of the building both for the transport of persons and/or material for the construction of the building and as a passenger and freight elevator for floors already utilized as residential or business premises during the construction phase of the building. This ensures that, on the one hand, construction workers and building materials can be transported in the elevator car during almost the entire construction period of the building. On the other hand, users of apartments or business premises occupied before completion of the building can be transported between at least the floors associated with these rooms in compliance with the regulations, without having to interrupt operation for days on end when adjustments are made to the lifting height of the elevator car during the construction phase.

In a further possible configuration of the method according to the invention, an assembly platform and/or a protective platform is/are temporarily installed above a momentary upper limit of the travel path of the construction phase elevator car, according to which, during the adaptation of the usable lifting height of the construction phase elevator car to an increasing elevator shaft height, the assembly platform and/or the protective platform can be lifted to a higher elevator shaft level by means of the self-propelled construction phase elevator car. This ensures that the at least one protective platform and, if necessary, also an assembly platform, which is relatively heavy and absolutely necessary as protection against falling objects, can be lifted along the newly created elevator shaft and fixed in a new position with little effort in terms of working time and lifting devices.

In a further possible configuration of the method according to the invention, the protective platform which can be raised by means of the self-propelled construction phase elevator car is configured as an assembly platform, from which the said at least one guide rail strand is extended upwards. On the one hand, the combination of protective platform and assembly platform results in cost savings for their manufacture. On the other hand, the protective platform and the assembly platform can each be brought into a new position in the elevator shaft suitable for the assembly work to be carried out in a single step and without additional lifting equipment by lifting by means of the self-propelled construction phase elevator car and fixing it there.

In a further possible configuration of the method according to the invention, the primary part of the drive system assembled for driving the construction phase elevator car comprises a plurality of driven friction wheels, wherein the construction phase elevator car is driven by an interaction of the driven friction wheels having the secondary part of the drive system attached along the travel path of the construction phase elevator car. The use of friction wheels as the primary part of a drive of a construction phase elevator car is advantageous because a corresponding secondary part extending along the entire travel path can be produced from simple and inexpensive members, and because relatively high speeds having low generation of noise can be realized with friction wheel drives.

In a further possible configuration of the procedure according to the invention, the at least one guide rail strand is used as a secondary part of the drive system of the self-propelled construction phase elevator car. By the use of the guide rail strand, which is in any case necessary for both the construction phase elevator car and the final elevator car, as the secondary part of the drive system allows very high costs to be saved for the manufacture and, in particular, for the installation and adjustment of such a secondary part extending over the entire elevator shaft height.

In a further possible configuration of the method according to the invention, at least two driven friction wheels are pressed against each of two opposing guide surfaces of the at least one guide rail strand for driving the construction phase elevator car, wherein the friction wheels acting on the same guide surface in each case are arranged spaced apart from another in the direction of the guide rail strand. By such an arrangement of at least four driven friction wheels acting on each guide rail strand, the necessary high driving force for lifting at least the construction phase elevator car and the protective platform or the combination of protective platform and assembly platform can be achieved.

In a further possible configuration of the method according to the invention, at least one of the friction wheels is rotationally mounted at one end of a pivot lever which is pivotally mounted at its other end on a pivot axis fixed to the construction phase elevator car, wherein the pivot axis of the pivot lever is arranged such that the center of the friction wheel lies below the center of the pivot axis when the friction wheel is placed or pressed against the guide surface of the guide rail strand associated with it. Such an arrangement of the at least one friction wheel ensures that when the construction phase elevator car is driven in an upward direction, a pressing force is automatically established between the friction wheel and the guide surface which is approximately proportional to the driving force transferred from the guide surface to the friction wheel. This avoids the friction wheels always having to be pressed so hard that a driving force necessary for the maximum total weight of the construction phase elevator car can be transferred.

In a further possible configuration of the method according to the invention, the at least one friction wheel is pressed against a guide surface of a guide rail strand at any time with a minimum pressing force by the effect of a spring member—for example a helical compression spring. In combination with the described arrangement of the friction wheels, the minimum pressing force causes that as soon as the friction wheels start driving the construction phase elevator car in upward direction, pressing forces between the friction wheels and the guide rail strand guide surfaces are automatically adjusted, which are approximately proportional to the current total weight of the construction phase elevator car.

In a further possible configuration of the method according to the invention, the at least one friction wheel is driven by an electric motor exclusively associated with this friction wheel or by a hydraulic motor exclusively associated with this friction wheel. Such a drive arrangement enables a very simple and compact drive configuration.

In a further possible configuration of the method according to the invention, the at least one friction wheel and the electric motor associated therewith or the friction wheel and the associated hydraulic motor are arranged on the same axis. With such an arrangement of friction wheel and drive motor, a further simplification of the entire drive configuration can be realized.

In a further possible configuration of the method according to the invention, in a drive system in which at least two driven friction wheels are pressed against each of two mutually opposite guide surfaces of the at least one guide rail strand and each friction wheel and its associated electric motor are arranged on the same axis, the electric motors of the friction wheels acting on the one guide surface of a guide rail strand are arranged offset by approximately one length of an electric motor compared to the electric motors of the friction wheels acting on the other guide surface in the axial direction of the friction wheels and electric motors. In that the electric motors, the diameter of which is considerably larger than the diameter of the friction wheels, are arranged offset from each other in the axial direction, it is achieved that the installation spaces of the electric motors of the friction wheels acting on one guide surface of the guide rail strand do not overlap with the installation spaces of the electric motors of the friction wheels acting on the other guide surface of the guide rail strand, even if the friction wheels arranged on either side of the guide rail strand are positioned so that their mutual distances measured in the direction of the guide rail strand are not substantially larger than the diameters of the electric motors. The necessary height of the installation space for the drive system is minimized by this arrangement of the drive system—particularly when using the drive electric motors having relatively large diameters.

In a further possible configuration of the method according to the invention, at least one group of several friction wheels is driven by a single electric motor associated with the group or by a single hydraulic motor associated with the group, a torque transmission to the friction wheels of the group being effected by means of a mechanical gear. With such a drive concept a simplification of the electrical or hydraulic part of the drive can be achieved.

In another possible configuration of the method according to the invention, a sprocket gear, a belt gear, a toothed gear or a combination of such gears is used as mechanical gear for the torque transmission to the friction wheels. Such gears make it possible to drive the friction wheels of a group of a plurality of friction wheels from a single drive motor.

In another possible configuration of the method according to the invention, each of the electric motors driving at least one friction wheel and/or an electric motor driving a hydraulic pump feeding at least one hydraulic motor driving at least one friction wheel is fed by at least one frequency converter controlled by a controller of the construction phase elevator system. Such a drive concept allows perfect regulation of the driving speed of the construction phase elevator car.

In a further possible configuration of the method according to the invention, a power supply device is installed to the construction phase elevator car, which power supply device comprises a conductor line installed along the elevator shaft, which is extended according to the increasing elevator shaft height during the construction phase. This enables a power supply to the construction phase elevator car that can be easily adjusted to the current elevator shaft height, which can also transfer the electrical power necessary for lifting the construction phase elevator car and the protective platform, or possibly for lifting the construction phase elevator car and the combination of protective platform and assembly platform.

In a further possible configuration of the method according to the invention, a holding brake acting between the construction phase elevator car and the at least one guide rail strand is activated during each downtime of the self-propelled construction phase elevator car of the construction phase elevator system, and having at least one friction wheel, the torque transferred from the associated drive motor to the at least one friction wheel for generating drive force is reduced to a minimum. Such a design has the advantage that during the standstill of the construction phase elevator car, the friction wheels do not have to apply the necessary vertical holding force. Therefore, they do not have to be pressed against the guiding surfaces of the guide rail strand. In this way, the problem of flattening the periphery of the friction linings during downtime can be largely defused. Since each friction wheel is pressed against the guide surface approximately proportional to the driving force transmitted between it and the guide surface due to the above described way of arrangement, it is necessary to reduce this driving force or the torque transmitted from the driving motor to the friction wheel to a minimum.

In a further possible configuration of the method according to the invention, a primary part of an electric linear drive is used as the primary part of the drive system for driving the construction phase elevator car and a secondary part of said electric linear drive fixed along the elevator shaft is used as the secondary part of said drive system. Such a configuration of the method according to the invention has the advantage that the drive of the construction phase elevator car is contact-free and wear-free, and the traction capability of the drive cannot be impaired by contamination.

In another possible configuration of the method according to the invention, at least one electric motor or hydraulic motor driving a pinion and rotational speed regulated by means of a frequency converter is used as the primary part of the drive system for driving the construction phase elevator car, and at least one rack strand fixed along the elevator shaft is used as the secondary part of said drive system. Such a configuration of the method according to the invention has the advantage that in the case of a pinion rack drive, the driving force is transferred positively and a holding brake on the construction phase elevator car is not absolutely necessary. In addition, relatively few driven pinions are necessary for the transfer of the entire driving force. With rotational speed regulation by means of a frequency inverter, in which the frequency inverter acts either on the electric motor driving at least one pinion or on an electric motor which regulates the rotational speed of a hydraulic pump feeding the hydraulic motor, the driving speed of the construction phase elevator car can be continuously regulated.

DESCRIPTION OF THE DRAWINGS

In the following, embodiments of the invention are explained based on the attached drawings. In which:

FIG. 6 is a detailed view of a fourth embodiment of the friction wheel drive of a self-propelled construction phase elevator car suitable to carry out the method according to the invention, having a section through the area shown by the detailed view.

DETAILED DESCRIPTION

Figure 1:
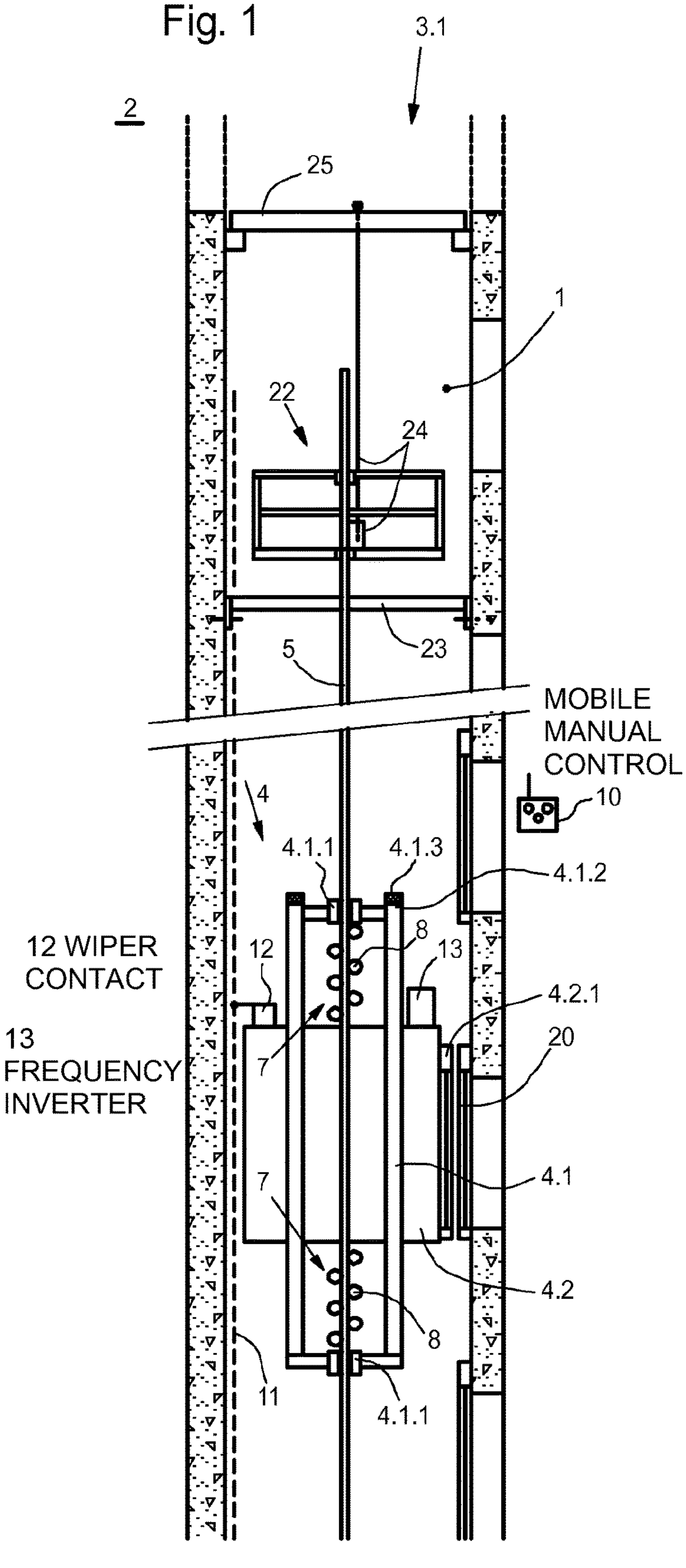
FIG. 1 is a vertical section through an elevator shaft having a self-propelled construction phase elevator car suitable to carry out the method according to the invention, having a friction drive as the drive system and having a first embodiment of assembly aid devices.

FIG. 1 schematically shows a construction phase elevator system 3.1, which is installed in an elevator shaft 1 of a building 2 in its construction phase and comprises a construction phase elevator car 4, the usable lifting height of which is gradually adapted to an increasing elevator shaft height. The construction phase elevator car 4 comprises a car frame 4.1 and a car body 4.2 mounted in the car frame. The car frame has car guide shoes 4.1.1, over which the construction phase elevator car 4 is guided on guide rail strands 5. These guide rail strands are extended upwards above the construction phase elevator car from time to time corresponding to the construction progress and, after reaching a final elevator shaft height, also serve for guiding a final elevator car (not represented) of a final elevator installation replacing the construction phase elevator car 4 (not represented). The construction phase elevator car 4 is designed as a self-propelled elevator car and comprises a drive system 7, which is preferably installed inside the car frame 4.1. The construction phase elevator car 4 can be equipped with different drive systems, wherein these drive systems each comprise a primary part attached to the construction phase elevator car 4 and a secondary part attached along the travel path of the construction phase elevator car. In FIG. 1, the primary part of the drive system 7 is schematically represented by a plurality of friction wheels 8 driven by (not represented) drive motors, which interact with the at least one guide rail strand 5 forming the secondary part in order to move the construction phase elevator car 4 up and down within its currently usable lifting height. The drive motors driving the friction wheels 8 can preferably be present in the form of electric motors or in the form of hydraulic motors. Electric motors are preferably fed by at least one frequency converter system to enable the regulation of the rotational speed of the electric motors. This ensures that the driving speed of the construction phase elevator car 4 can be continuously regulated so that any driving speed between a minimum speed and a maximum speed can be actuated. The minimum speed is used, for example, for actuating the stop positions or for manually controlled driving for lifting assembly aid devices by means of the construction phase elevator car, and the maximum speed is used, for example, to operate an elevator operation for construction workers and for users or residents of the floors already constructed. A corresponding regulation of the rotational speed of hydraulic motors can be achieved either by feeding them by a hydraulic pump, preferably installed on the construction phase elevator car 4, the delivery flow of which can be regulated electrohydraulically at constant rotational speed, or by feeding them by a hydraulic pump driven by an electric motor which can be speed-controlled by means of frequency conversion.

The control of the drive motors of the drive system 7 of the construction phase elevator car 4 can be carried out optionally by a conventional elevator control (not represented) or by means of a mobile manual control 10—preferably with wireless signal transmission.

The feed to the electric motors of the drive system of the construction phase elevator car 4 can be supplied via a conductor line 11 guided along the elevator shaft 1. In this case, a frequency inverter 13 arranged on the construction phase elevator car 4 can be supplied with alternating current via the conductor line 11 and corresponding wiper contacts 12, wherein the frequency converters feed the electric motors driving the friction wheels 8 or at least one electric motor driving a hydraulic pump with variable rotational speed. Alternatively, a stationary AC-DC converter can feed direct current into such a conductor line, which is tapped on the construction phase elevator car by means of the wiper contacts and supplied to the variable-speed electric motors of the drive system via at least one converter having controllable output frequency. If the friction wheels 8 are driven by hydraulic motors fed by a hydraulic pump having a flow rate adjustable at constant rotational speed, no frequency conversion is necessary.

To enable the above mentioned elevator operation for construction workers and floor users, the construction phase elevator car 4 is equipped with a car door system 4.2.1 controlled by the elevator control, which interacts with shaft doors 20, each of which is installed prior to an adaptation of the usable lifting height of the construction phase elevator car 4 along the additional driving range in elevator shaft 1.

In the construction phase elevator system 3.1 represented in FIG. 1, an assembly platform 22 is arranged above the currently usable lifting height of the construction phase elevator car 4, which can be moved up and down along an upper portion of the elevator shaft 1. From such an assembly platform 22, the at least one guide rail strand 5 is extended above the currently usable lifting height of the construction phase elevator car 4, wherein other elevator components can also be assembled in the elevator shaft 1.

A first protective platform 25 is temporarily fixed in the uppermost area of the currently present elevator shaft 1. On the one hand, this has the task of protecting persons and devices in elevator shaft 1—particularly in the aforementioned assembly platform 22—from objects that could fall down during the construction work taking place on building 2. On the other hand, the first protection platform 25 can serve as a supporting member for a lifting apparatus 24, with which the assembly platform 22 can be raised or lowered. In the embodiment of the construction phase elevator system shown in FIG. 1, the first protective platform 25 having the assembly platform 22 suspended thereon must be lifted from time to time by means of a construction crane to a higher level corresponding to the construction progress in the current uppermost region of the elevator shaft, where the first protective platform 25 is then temporarily fixed.

Below the assembly platform 22, a second protective platform 23 is represented in FIG. 1, temporarily fixed in the elevator shaft 1, which protects persons and devices in the elevator shaft 1 from objects falling from the mentioned assembly platform 22.

In the construction phase elevator system 3.1 represented in FIG. 1, the self-propelled construction phase elevator car 4 and its drive system 7 are dimensioned such that at least the said second protective platform 23 can be lifted by means of the self-propelled construction phase elevator car 4 in elevator shaft 1 after the first protective platform 25 having the assembly platform 22 suspended from it has been lifted by the construction crane for increasing the usable lifting height of the construction phase elevator car. For this purpose, the car frame 4.1 of the construction phase elevator car 4 is designed with support members 4.1.2, which are preferably provided with damping members 4.1.3.

In another possible embodiment of the construction phase elevator system 3.1, both the second protective platform 23 and the assembly platform 22 can be lifted together by the construction phase elevator car 4 to a level desired for specific assembly work, where they are temporarily fixed in the elevator shaft 1 or temporarily retained by the construction phase elevator car. Since in this case no lifting apparatus is present for lifting the assembly platform 22, this embodiment assumes that the construction phase elevator car, in addition to its function of ensuring the said elevator operation for construction workers and floor users, can be made available sufficiently frequently and for a sufficiently long time for lifting and, if necessary, holding the assembly platform 22.

Figure 2:
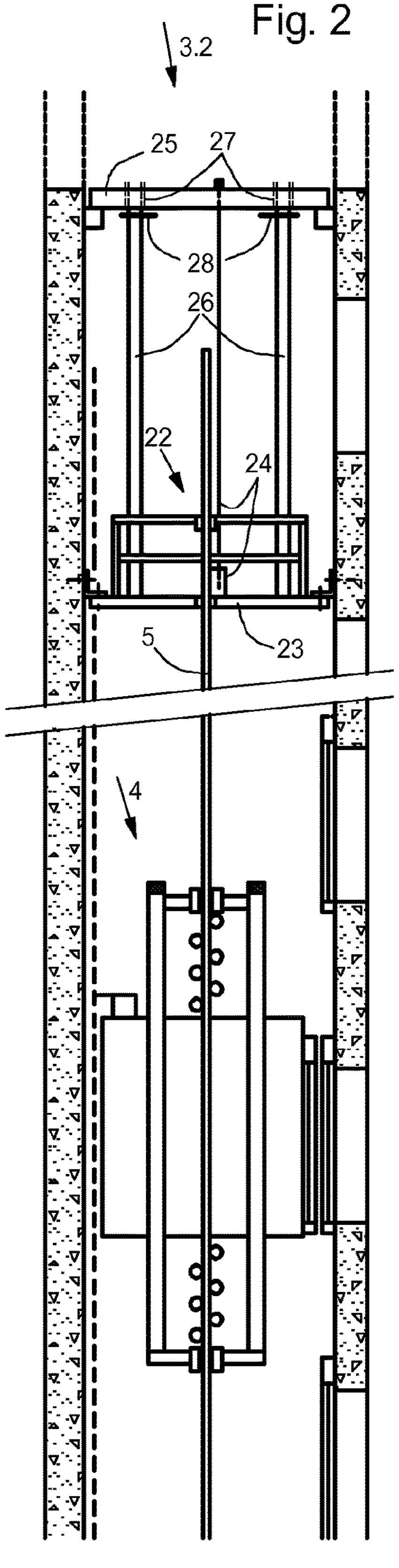
FIG. 2 is a vertical section through an elevator shaft having a self-propelled construction phase elevator car suitable to carry out the method according to the invention, having a friction drive as the drive system and having a second embodiment of assembly aid devices.

FIG. 2 shows a construction phase elevator system 3.2, which differs from the construction phase elevator system 3.1 according to FIG. 1 in that no construction crane is necessary to lift the first protective platform 25 and the assembly platform 22. Before any increase in the lifting height of the construction phase elevator car 4, the said three components—first protective platform 25, assembly platform 22 and second protective platform 23—are lifted with the aid of the self-propelled construction phase elevator car 4 equipped with a correspondingly powerful drive system, according to which the first protective platform 25 is fixed again in a higher position above the current uppermost driving range of the construction phase elevator car. At least one distance member 26 is fixed between the assembly platform 22 and the first protective platform 25 in such a way that an intended distance is present between the first protective platform 25 and the assembly platform 22 before the lifting of the three components. In the portion of the elevator shaft 1 lying within this distance after each lifting of the said three components, the assembly platform 22 serving for extending the at least one guide rail strand 5 and for assembling further elevator components and the second protective platform 23 can be moved with the aid of the lifting device 24. Advantageously, the at least one distance member 26 is fastened at its lower end to the assembly platform 22, and the at least one distance member 26 can slide through at least one opening 27 in the first protective platform 25 associated with the at least one distance member when the assembly platform is moved by means of the lifting device 24 against the first protective platform 25. Before lifting the said three components again to increase the lifting height of the construction phase elevator car, the assembly platform 22 and the at least one distance member 26 are lowered by means of the lifting device 24 to such an extent that the upper end of the distance member is located just inside the said opening 27 in the first protective platform 25. Then the upward sliding of the at least one distance member 26 through the first protective platform 25 is prevented by means of a blocking device—for example by means of a plug-in bolt 28—so that when the assembly platform 22 is raised again by the self-propelled construction phase elevator car 4, the first protective platform 25 is also raised with the intended distance to the assembly platform 22.

In FIG. 2 it is also shown that the second protective platform 23 and the assembly platform 22 can advantageously form a liftable unit by means of the self-propelled construction phase elevator car 4 by forming the second protective platform 23 shown in FIG. 1 into the assembly platform 22 shown in FIG. 2, from which assembly platform 22 at least one guide rail strand 5 can be extended upward at a minimum. However, such a combination of protective platform and assembly platform is not absolutely necessary.

Figures 3A, 3B:
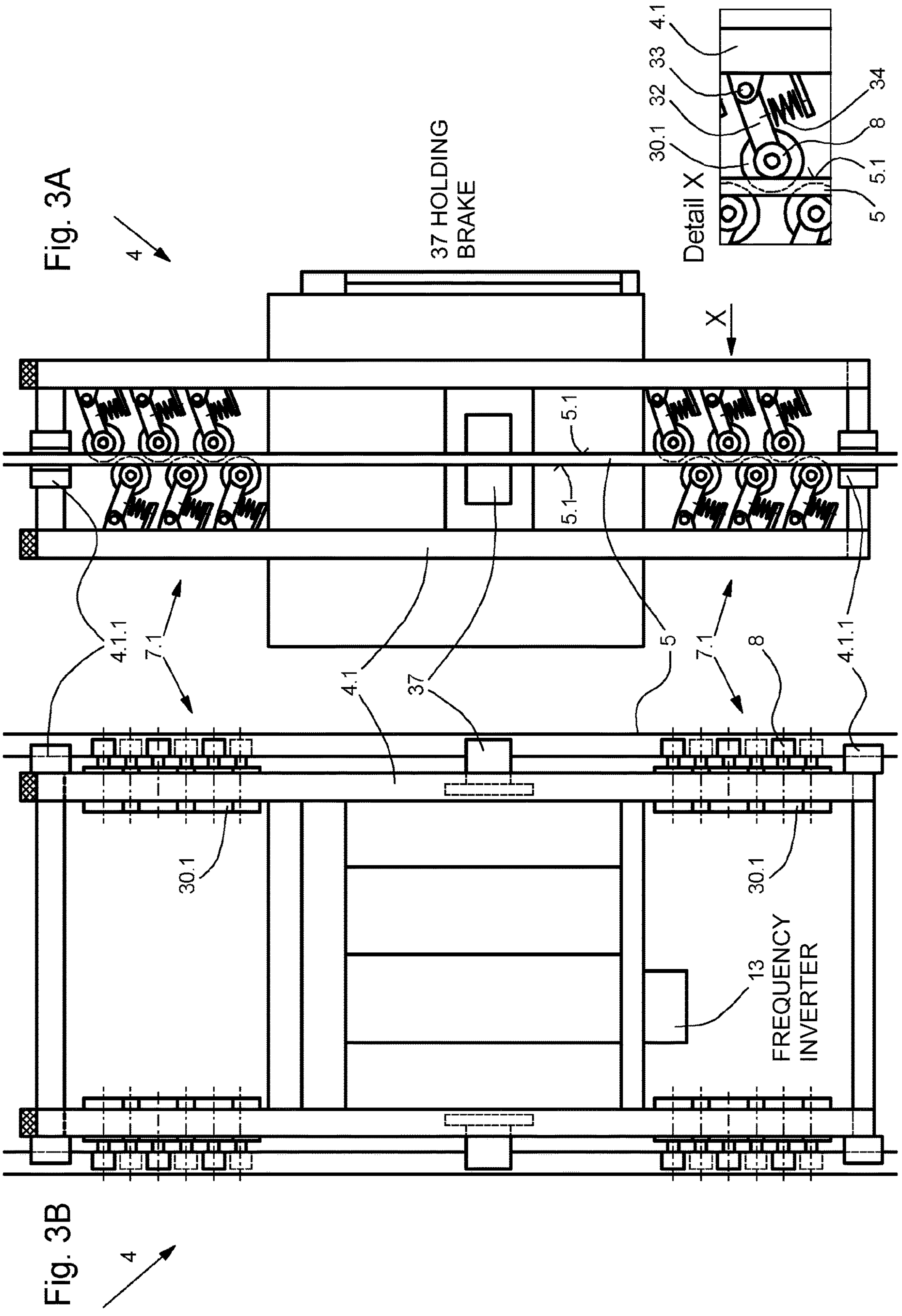
FIG. 3A is a side view of a self-propelled construction phase elevator car having a first embodiment of the friction drive suitable to carry out the procedure according to the invention.
FIG. 3B is a front view of the construction phase elevator car according to FIG. 3A.

FIG. 3A shows a construction phase elevator car 4 suitable for use in the method according to the invention in a side view, and FIG. 3B shows this construction phase elevator car in a front view. The construction phase elevator car 4 comprises a car frame 4.1 having car guide shoes 4.1.1 and a car body 4.2 mounted in the car frame, which is provided for the accommodation of passengers and objects. The car frame 4.1 and thus also the car body 4.2, are guided by guide rail strands 5 via car guide shoes 4.1.1, which guide rail strands are preferably fastened to walls of the elevator shaft and—as explained above—form the secondary part of the drive system 7.1 of the construction phase elevator car 4 and later serve to guide the final elevator car of a final elevator installation.

The drive system 7.1 represented in FIGS. 3A and 3B comprises a plurality of driven friction wheels 8 which interact with the guide rail strands 5 to move the self-propelled construction phase elevator car 4 along an elevator shaft of a building in its construction phase. The friction wheels are each arranged within the car frame 4.1 of the construction phase elevator car 4 above and below the car body 4.2, wherein at least one friction wheel acts on each of the guide surfaces 5.1 of the guide rail strands 5, which lie opposite each other. If there is enough room available for the drive motors between the car body and the car frame, the friction wheels can also be attached to the side of the car body. In the embodiment of the drive system 7.1 shown here, each of the friction wheels 8 is driven by an associated electric motor 30.1, wherein the friction wheel and the associated electric motor are preferably (coaxially) arranged on the same axis. Each of the friction wheels 8 is rotationally mounted coaxially with the rotor of the associated electric motor 30.1 on one end of a pivot lever 32. The pivot lever 32 associated with each of the friction wheels is pivotally mounted at its other end on a pivot axis 33 fixed to the car frame 4.1 of the construction phase elevator car 4 in such a way that the center of the friction wheel 8 lies below the axis line of the pivot axis 33 of the pivot lever 32 when the friction wheel 8 is pressed against its associated guide surface 5.1 of the at least one guide rail strand. The arrangement of pivot lever 32 and friction wheel 8 is carried out in such a way that a straight line extending from pivot axis 33 to the point of contact between friction wheel 8 and guide surface 5.1 is preferably inclined at an angle of 15° to 30° relative to a normal to guide surface 5.1. The pivot lever 32 is loaded by a pretensioned compression spring 34 in such a way that the friction wheel 8 mounted at the end of the pivot lever is pressed with a minimum pressing force against the guide surface 5.1 associated with it. With the described arrangement of the friction wheels and the pivot levers it is achieved that during the driving of the construction phase elevator car 4 in upward direction between the friction wheels 8 and the associated guide surfaces 5.1 of the guide rail strand, pressing forces are automatically generated, which are approximately proportional to the driving force transferred from the guide surface to the friction wheel. This ensures that the friction wheels do not have to be continuously pressed down as much as would be necessary for lifting the elevator car 4, which is loaded with maximum load, and the other components discussed above. This considerably reduces the risk of flattening of the periphery of the plastic-coated friction wheels as a result of prolonged clamping with the maximum necessary clamping force.

An additional measure for preventing a flattening of the plastic friction linings of the friction wheels 8 consists in the fact that during each downtime of the construction phase elevator car 4 an unloading of the friction wheels 8 takes place by activating a holding brake 37 acting between the construction phase elevator car and the elevator shaft—preferably between the construction phase elevator car and the at least one guide rail strand 5—and the torque transferred by the drive motors 30.1 to the friction wheels is reduced at a minimum. As a holding brake, a brake which is only used for this purpose or a controllable safety brake can be used.

For regulating the driving speed, the electric motors 30.1 are fed via a frequency converter 13, which is controlled by a (not shown) elevator control.

As can be seen from FIGS. 3A, 3B and detail X shown, the diameters of the electric motors 30.1 are substantially larger than the diameters of the friction wheels 8 driven by the electric motors. This is necessary so that the electric motors can generate sufficiently high torques for driving the friction wheels. In order to provide sufficient installation space for the electric motors 30.1 arranged on both sides of the guide rail strand 5, relatively large vertical spaces are necessary between the individual friction wheel arrangements. As a result, the installation spaces for the drive system 7.1 and thus the entire car frame 4.1 become correspondingly high.

Figures 4A, 4B:
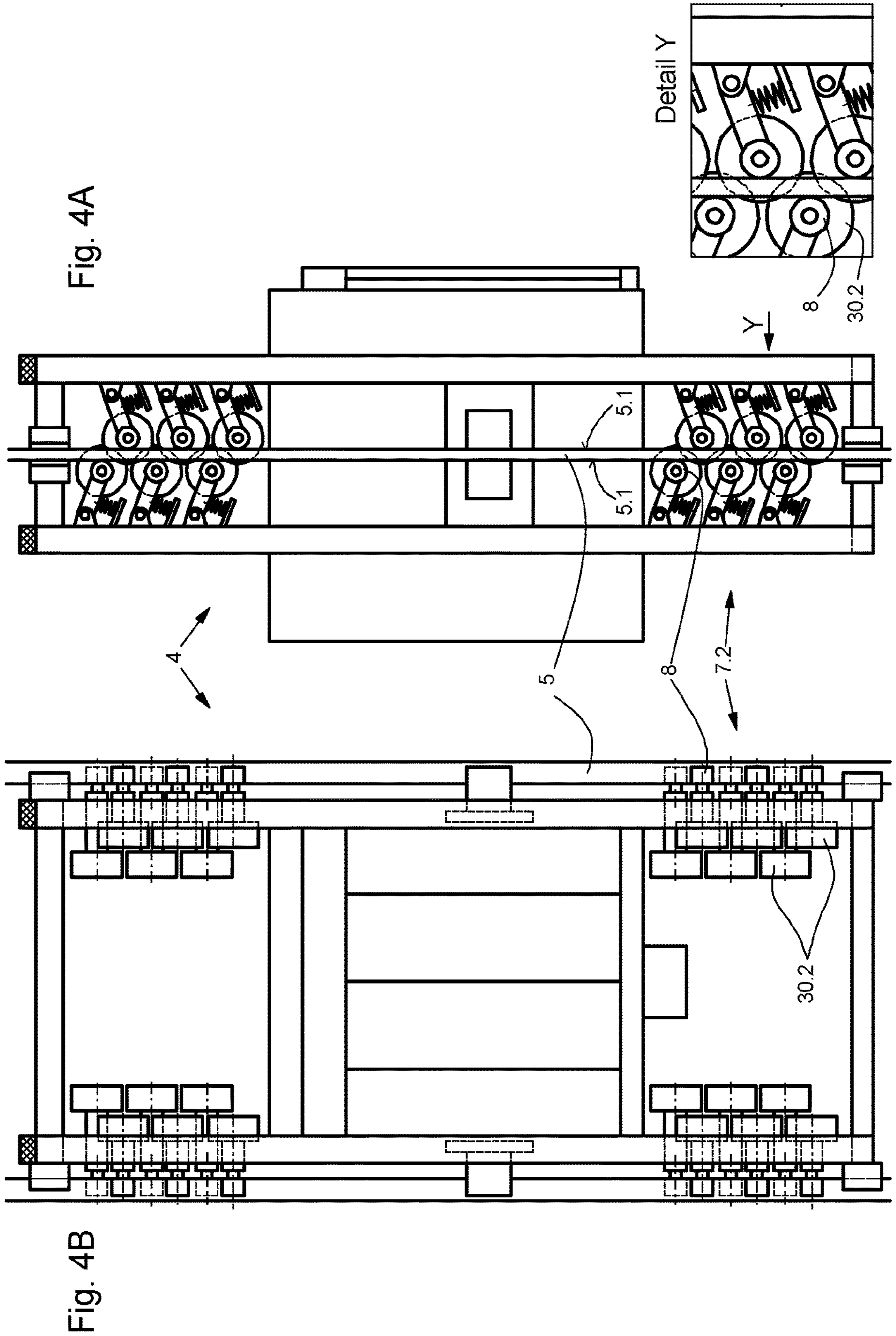
FIG. 4A is a side view of a self-propelled construction phase elevator car having a second embodiment of the friction drive suitable to carry out the procedure according to the invention.
FIG. 4B is a front view of the construction phase elevator car according to FIG. 4A.

FIGS. 4A and 4B show a self-propelled construction phase elevator car 4, which is very similar in function and appearance to the construction phase elevator car shown in FIGS. 3A and 3B. A drive system 7.2 with driven friction wheels 8 is represented, which allows the use of electric motors whose diameters correspond, for example, to three to four times the friction wheel diameter without their vertical spacing from one another having to be greater than the motor diameters. The height of the installation spaces for the drive system 7.2 can thus be minimized. This is achieved in that the electric motors 30.2 of the friction wheels 8 acting on one guide surface 5.1 of a guide rail strand 5 are arranged offset by approximately one motor length in the axial direction of the electric motors relative to the electric motors of the friction wheels acting on the other guide surface 5.1. Although the spacing between two such electric motors is smaller than their diameter, this measure prevents the installation spaces of these electric motors from overlapping. This is particularly clear from FIG. 4B, where it is also shown that the electric motors 30.2 are preferably relatively short in design and have relatively large diameters. With large motor diameters, the necessary drive torques for the friction wheels 8 are easier to generate.

Figures 5A, 5B:
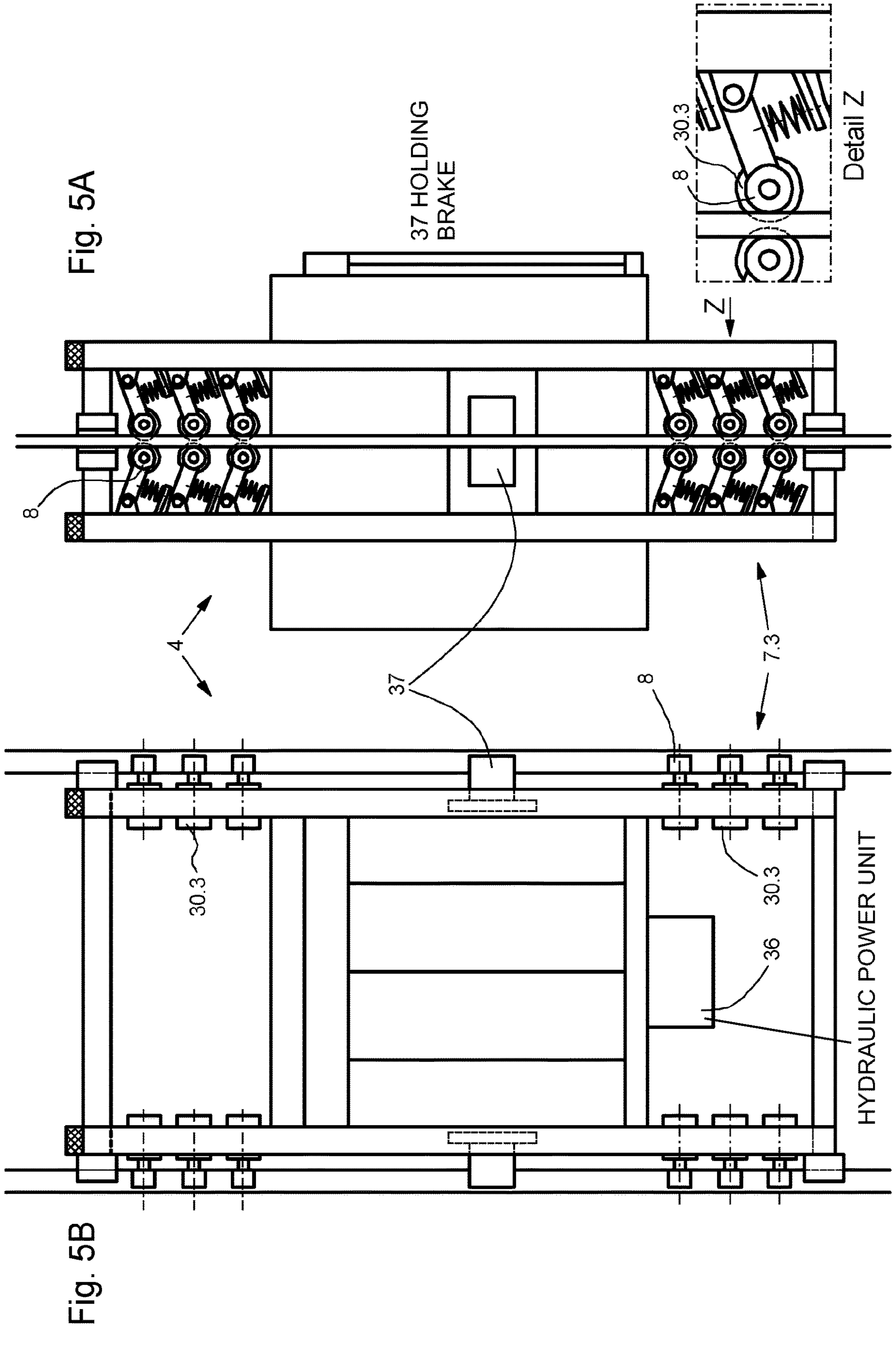
FIG. 5A is a side view of a self-propelled construction phase elevator car having a third embodiment of friction drive suitable to carry out the procedure according to the invention.
FIG. 5B is a front view of the construction phase elevator car according to FIG. 5A.

FIGS. 5A and 5B represent a self-propelled construction phase elevator car 4, which is very similar in function and appearance to the construction phase elevator cars shown in FIGS. 3A, 3B and 4A, 4B. The height of the installation spaces for the drive system 7.3 and thus the overall height of the construction phase elevator car is, however, reduced in this embodiment by using smaller drive motors for the friction wheels 8. The vertical distances between the individual friction wheel arrangements are no longer determined here by the installation spaces for the drive motors. This is achieved by the use of hydraulic motors 30.3 instead of electric motors for driving the friction wheels 8. In relation to the total motor volume, hydraulic motors are capable of generating several times higher torques than electric motors. Hydraulic motors can therefore also be used to drive friction wheels with larger diameters, which allow a higher pressure force to be applied and can therefore transmit a higher traction force.

Hydraulic drives require at least one hydraulic power unit 36, which preferably comprises an electrically driven hydraulic pump. To feed the hydraulic motors 30.3 driving the friction wheels 8 at variable speeds, for example, a hydraulic pump with electrohydraulically controllable delivery volume driven by an electric motor with constant rotational speed or a hydraulic pump with constant delivery volume driven by an electric motor with frequency converter speed control can be used. The hydraulic motors are preferably operated in hydraulic parallel circuit. Series circuitry is however also possible. The power supply to the hydraulic power unit 36 is preferably carried out via a conductor line, as explained for the feed of the electric motors in the context of FIGS. 1 and 2.

The construction phase elevator car 4 according to FIGS. 5A and 5B is also locked in the elevator shaft during a downtime by holding brakes 37, wherein the driving torques exerted by the hydraulic motors 30.3 on the friction wheels 8 are reduced to a minimum.

FIG. 6 shows a part of a drive system 7.4 of a self-propelled construction phase elevator car arranged below the car body 4.2 of this construction phase elevator car. An arrangement of a group of a plurality of friction wheels 8.1-8.6 rotationally mounted on pivot levers 32.1-32.6 and pressed against a guide rail strand 5 by means of compression springs 34.1-34.6 is shown, which arrangement has already been explained above in the context of the description in FIGS. 3A and 3B. In contrast to the drive system shown in FIGS. 3A, 3B, 4A, 4B and 5A, 5B, however, in this case not each of the friction wheels 8.1-8.6 is individually driven by a drive motor assigned to the friction wheel, but the friction wheels 8.1-8.6 are driven by a common drive motor 30.4 associated with the group of friction wheels via a toothed wheel gear 38 with two drive chain wheels 38.1, 38.2 rotating in opposite directions and via a mechanical gear in the form of a chain gear arrangement 40. For example, a variable-speed electric motor or a variable-speed hydraulic motor can be used as a common drive motor. Instead of the chain gear arrangement 40, other gear types can also be used, such as belt gears, preferably toothed belt gears, toothed gears, bevel shaft gears or combinations of such gears. The part of the chain gear arrangement 40 represented on the left side of the drive system 7.4 comprises a first chain strand 40.1 which transfers the rotational movement from the drive chain wheel 38.1 of the toothed gear 38 to a triple chain wheel 40.7 mounted on the stationary pivot axis of the uppermost pivot lever 32.1. On the one hand, from this triple chain wheel 40.7 the rotational movement is transferred via a second chain strand 40.2 to a chain wheel fixed on the rotational axis of the friction wheel 8.1 and thus to the friction wheel 8.1. On the other hand, the rotational movement is transferred from the triple chain wheel 40.7 by means of a third chain strand 40.3 to a triple chain wheel 40.8 arranged below it and mounted on the fixed pivot axis of the central pivot lever 32.2. On the one hand, from this triple chain wheel 40.8 the rotational movement is transferred by means of a fourth chain strand 40.4 to a chain wheel fixed on the rotational axis of the friction wheel 8.2 and thus to the friction wheel 8.2. On the other hand, the rotational movement is transferred from the triple chain wheel 40.8 by means of a fifth chain strand 40.5 to a triple chain wheel 40.9 arranged below it and mounted on the fixed pivot axis of the lowest pivot lever 32.3. From this triple chain wheel 40.9 the rotational movement is transferred via a sixth chain strand 40.6 to a chain wheel fixed on the rotational axis of the lowest friction wheel 8.2 and thus to the friction wheel 8.2. The part of the chain transmission arrangement 40 represented on the right side of the drive system 7.4 is arranged substantially symmetrically to the part of the chain gear 40 described above, represented on the left side of the drive system 7.4, and has the same functions and effects.

Figure 7:
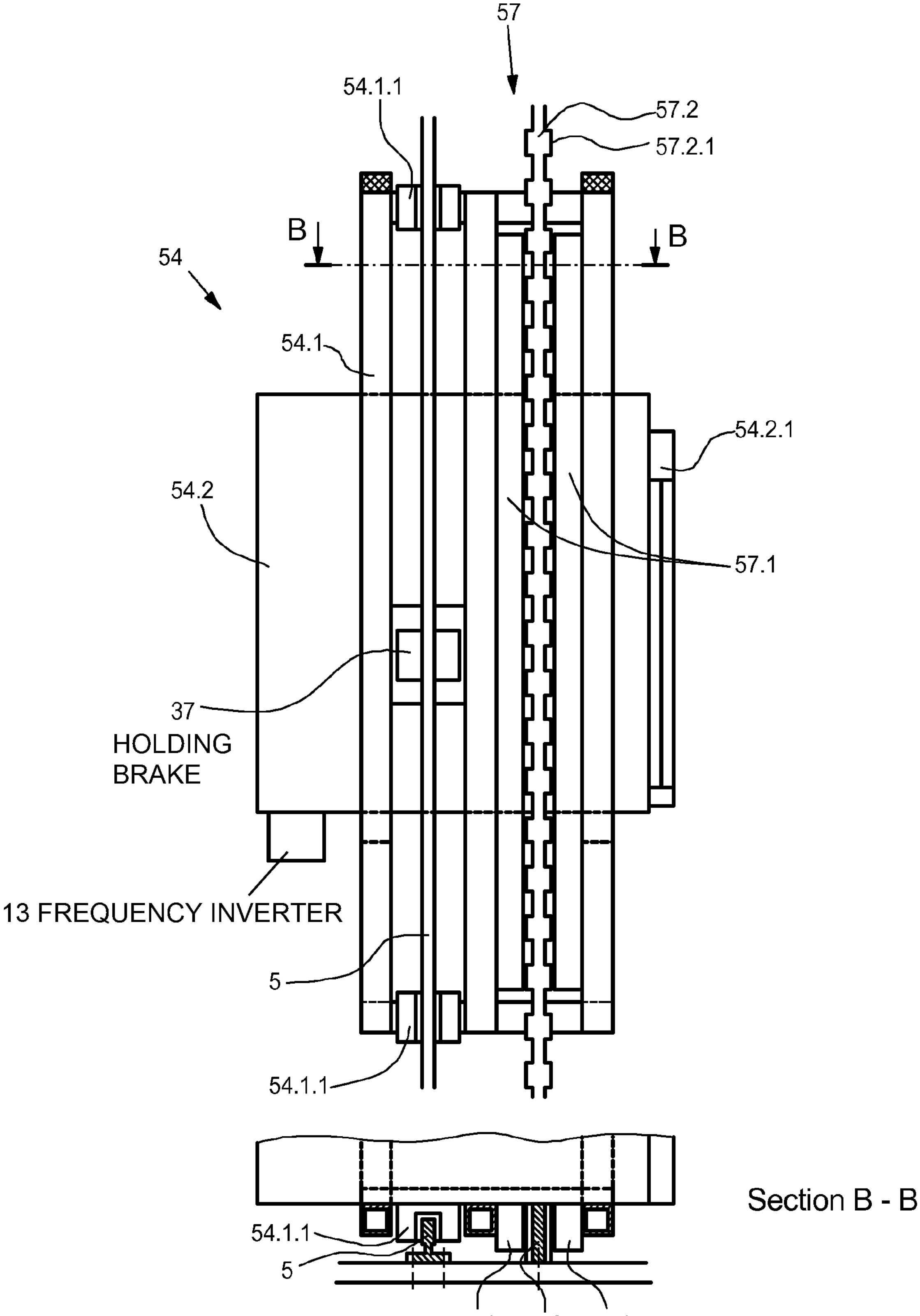
FIG. 7 is a side view of a self-propelled construction phase elevator car suitable to carry out the method according to the invention, having another embodiment of its drive system, as well as a section through the area of the drive system.
Figure 7:
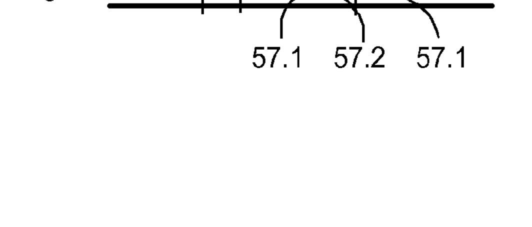

FIG. 7 shows another possible embodiment of a self-propelled construction phase elevator car suitable for use in the method according to the invention. This construction phase elevator car 54 comprises a car frame 54.1 and a car body 54.2 mounted in the car frame with a car door system 54.2.1. The car frame 54.1, and thus also the car body 54.2, are guided via car guide shoes 54.1.1 on guide rail strands 5, which guide rail strands are preferably fastened to the walls of an elevator shaft. At least one electric linear motor, preferably a reluctance linear motor, serves as drive system 57 for the construction phase elevator car 54, which linear motor comprises at least one primary part 57.1 fastened to the car frame 54.1 and at least one secondary part 57.2 extending along the travel path of the construction phase elevator car 54 and fixed to the elevator shaft. In the embodiment shown in FIG. 7, the construction phase elevator car 54 is equipped with a drive system 57, which comprises one reluctance linear motor on each side of the construction phase elevator car 54 with one primary part 57.1 and one secondary part 57.2. Each primary part 57.1 contains rows of electrically controllable electromagnets arranged on two sides of the associated secondary part, which are not shown here. In the reluctance linear motor, the secondary part 57.2 is a rail of soft magnetic material, which has protruding regions 57.2.1 at regular spacings on both sides facing the electromagnets of the primary part 57.1. With suitable electrical actuation of the electromagnets, which actuation is generally known, maximum magnetic fluxes result between two adjacent electromagnets having opposite polarity when the present magnetic resistance is at its lowest, i.e. when the protruding regions 57.2.1 of the secondary part are located approximately in the center of the magnetic flux between two electromagnets. The magnetic fluxes generate forces that attempt to minimize the magnetic resistance (reluctance) for the magnetic fluxes, with the result that the protruding areas 57.2.1 of secondary part 57.2, which act like poles, are drawn towards the center between two adjacent electromagnets that are under maximum current at that moment. In this way, a plurality of electromagnetic pairs, whose maximum energization or magnetic flux is mutually offset in time, produce the driving force necessary for driving the self-propelled construction phase elevator car 54.

Basically, all known linear motor principles can be used as a drive system for a self-propelled construction phase elevator car, for example linear motors with a plurality of permanent magnets arranged along the secondary part as counter poles to electromagnets driven with alternating current strength in the primary part. For self-propelled construction phase elevator cars with large usable lifting height, however, reluctance linear motors can be realized at the lowest cost.

For actuating such electric linear motors, it is advantageous to use frequency converters whose mode of operation is generally known. Such a frequency converter 13 is attached to the car frame 54.1 in FIG. 7 below the car body 54.2. A holding brake 37 acting between the construction phase elevator car 54 and the guide rail strand 5 also locks the construction phase elevator car 54 during its standstill in this embodiment, so that the linear motor of the drive system 57 does not have to be permanently activated and does not excessively heat up.

Figure 8:
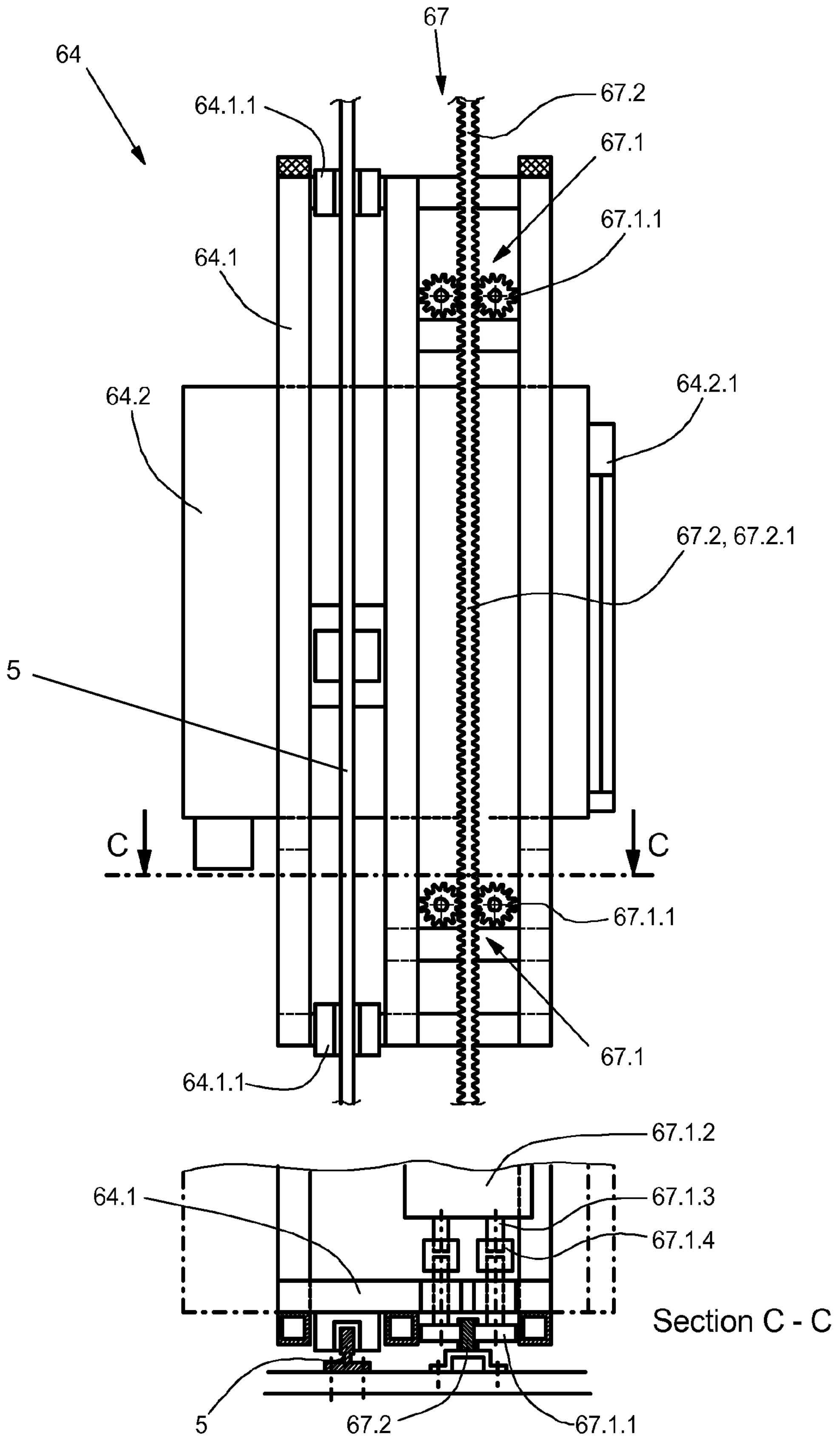
FIG. 8 is a side view of a self-propelled construction phase elevator car suitable to carry out the method according to the invention, having another embodiment of its drive system, as well as a section through the area of the drive system.

FIG. 8 shows another possible embodiment of a self-propelled construction phase elevator car suitable for use in the method according to the invention. This construction phase elevator car 64 comprises a car frame 64.1 and a car body 64.2 mounted in the car frame. This car body is also provided with a car door system 64.2.1, which interacts with shaft doors on the floors of the building currently in its construction phase. The car frame 64.1, and thus also the car body 64.2, are guided via car guide shoes 64.1.1 on guide rail strands 5, which guide rail strands are preferably fastened to the walls of an elevator shaft. The drive system 67 for the construction phase elevator car 64 serves as a pinion-rack system, which comprises as primary part 67.1 at least one pinion 67.1.1 driven by an electric motor or electric geared motor 67.1.2 and as secondary part 67.2 at least one rack 67.2.1 extending along the travel path of the construction phase elevator car 64 and temporarily fixed in the elevator shaft during the construction phase of the building. In the embodiment represented in FIG. 8, the construction phase elevator car 64 is equipped with a drive system 67, which comprises a rack 67.2.1 fixed in the elevator shaft on each of two sides of the construction phase elevator car 64, each of the racks having teeth on two opposing sides. A total of four pairs of driven pinions 67.1.1 interact with the two racks 67.2.1 to move the self-propelled construction phase elevator car 64 up and down the elevator shaft. Preferably, each of the four pairs of pinions 67.1.1 is driven by an electric geared motor 67.1.2 installed in the car frame 64.1, preferably having two output shafts 67.1.3 arranged side by side and driven by a distribution gear. Each of the two output shafts is connected via a torsionally elastic coupling 67.1.4 to a shaft of the associated pinion 67.1.1, which is mounted in the car frame 64.1. This embodiment allows the use of standard motors with sufficient power even with closely spaced axes of a pair of pinions. In an alternative embodiment of the pinion-rack system, all pinions 67.1.1 can be driven by an electric motor or electric geared motor associated with one of the pinions. In both embodiments mentioned, by the use of asynchronous motors, it is ensured that all pinions are driven at the same high torque at all times. It goes without saying that such a construction phase elevator car 64 can also be equipped with more than four pairs of pinions and related drive devices. This may be necessary in particular if the construction phase elevator car has to lift assembly aid devices in addition to its own weight, as described above in the description to FIGS. 1 and 2.

Figure 9:
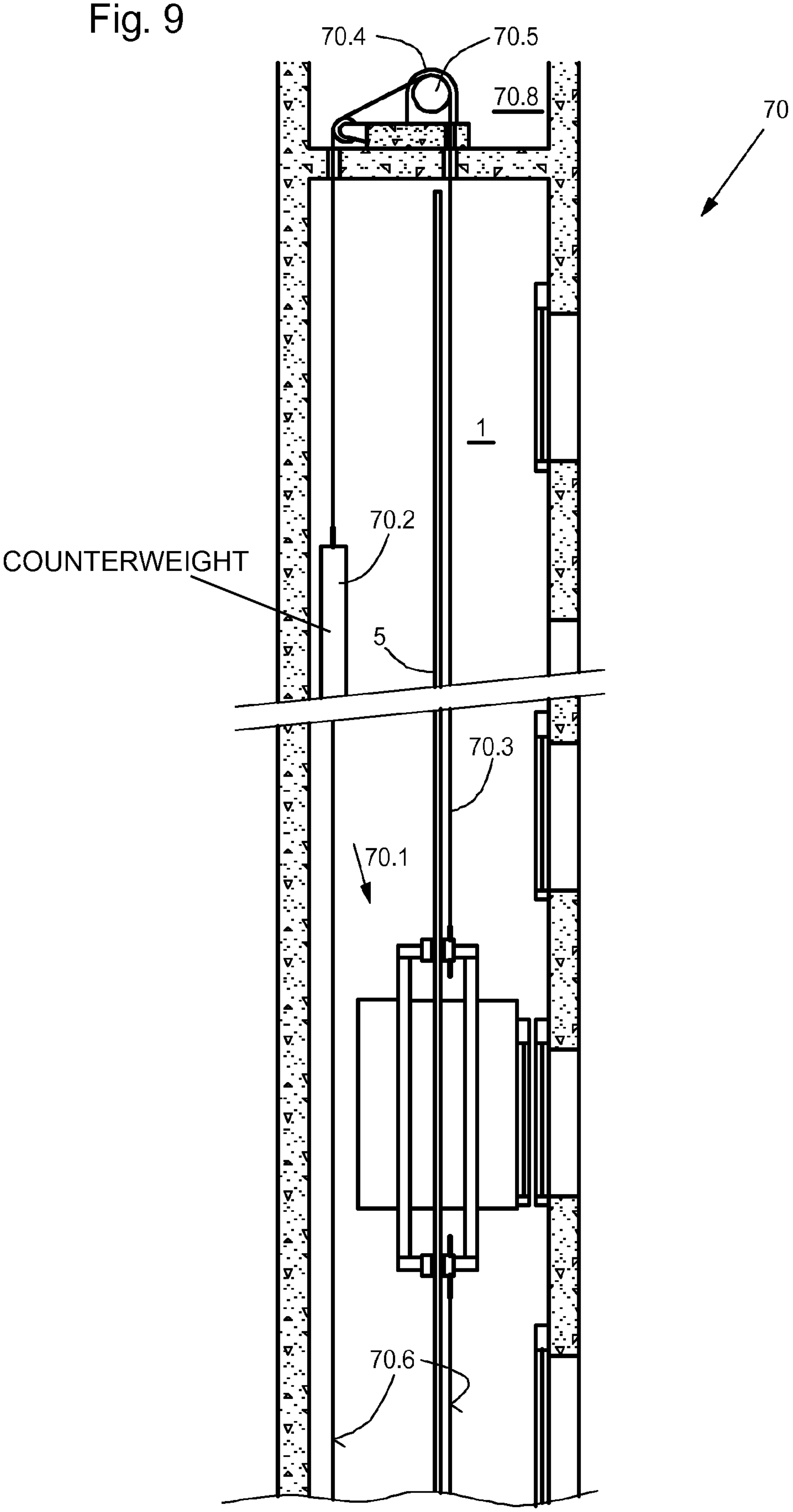
FIG. 9 is a vertical section through a final elevator installation constructed in accordance with the method according to the invention, having an elevator car and a counterweight, wherein the elevator car and the counterweight hang on flexible support means and are driven via these support means by a driving engine.

FIG. 9 shows a vertical section through a final elevator installation 70 created in elevator shaft 1 in accordance with the method according to the invention. This comprises an elevator car 70.1 and a counterweight 70.2, which hang on flexible support means 70.3 and are driven via these support means by a stationary driving engine 70.4 with a traction sheave 70.5. The driving engine 70.4 is preferably installed in an engine room 70.8 arranged above the elevator shaft 1. After elevator shaft 1 had reached its final height, the self-propelled construction phase elevator car (4; 54; 64, FIGS. 1-7) used during the construction phase has been dismantled. Subsequently, the elevator car 70.1, the counterweight 70.2, the driving engine 70.4 and the support means 70.3 of the final elevator installation 70 have been assembled, wherein the elevator car 70.1 is guided on the same guide rails 5 on which the construction phase elevator car was guided. The reference sign 70.6 designates compensating traction means—for example compensation ropes or compensation chains—with which a final elevator installation 70 is preferably equipped. Such compensation traction means 70.6 are preferably guided around a tension pulley arranged in the foot of the elevator shaft, which is not visible here. However, they can also hang freely in elevator shaft 1 between the elevator car 70.1 and the counterweight 70.2.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for erecting a final elevator installation in an elevator shaft of a building, the method comprising the steps of:

installing a construction phase elevator system in the elevator shaft for use during a construction phase of the building while the elevator shaft becomes higher with increasing building height, the construction phase elevator system including a self-propelled construction phase elevator car, and adapting a usable lifting height of the construction phase elevator car to an increasing height of the elevator shaft;

installing at least one guide rail strand in the elevator shaft for guiding the construction phase elevator car along a travel path in the elevator shaft;

assembling a drive system for driving the construction phase elevator car, the drive system including a primary part attached to the construction phase elevator car and a secondary part attached in the elevator shaft along the travel path;

extending the at least one guide rail strand and the secondary part of the drive system upward in the elevator shaft during the construction phase in accordance with the increasing elevator shaft height, wherein the construction phase elevator car is adapted to be used both for transporting persons and/or material for construction of the building and as a passenger and freight elevator for floors already used as residential or business premises during the construction phase of the building;

after the elevator shaft has reached a predetermined final height, removing the construction phase elevator system from the elevator shaft and installing a final elevator system in the elevator shaft which final elevator system is modified compared to the construction phase elevator system; and wherein the final elevator system has an elevator car with a drive system that is modified compared to the drive system of the construction phase elevator car.

2. The method according to claim 1 wherein the final elevator system has an elevator car with a drive system based on an operating principle different from an operating principle of the drive system of the construction phase elevator car.

3. The method according to claim 1 including guiding an elevator car of the final elevator system on the at least one guide rail strand on which the construction phase elevator car was guided.

4. The method according to claim 1 including installing at least one of an assembly platform and a protective platform above an upper limit of the travel path of the construction phase elevator car and, wherein during the adaptation of the usable lifting height of the construction phase elevator car to the increasing elevator shaft height, including lifting the at least one of the assembly platform and the protective platform from a current level to a higher level in the elevator shaft by the construction phase elevator car.

5. The method according to claim 4 wherein the protective platform and the assembly platform are configured as a liftable unit and including extending the at least one guide rail strand upwards from the liftable unit.

6. The method according to claim 1 wherein the primary part of the drive system includes a plurality of driven friction wheels, and including driving the construction phase elevator car along the travel path by an interaction of the friction wheels with the secondary part of the drive system attached in the elevator shaft.

7. The method according to claim 6 wherein the at least one guide rail strand is included in the secondary part of the drive system.

8. The method according to claim 7 including, for driving the construction phase elevator car, pressing at least one of the friction wheels against one guide surface of the at least one guide rail and pressing another of the friction wheels against an opposed guide surface of the at least one guide rail.

9. The method according to claim 8 wherein the one of the friction wheels is a first friction wheel and the another of the friction wheels is a second friction wheel, and including pressing a third of the friction wheels against the one guide surface arranged spaced apart from the first friction wheel in the direction of the travel path or pressing the third of the friction wheels against the opposed guide surface arranged spaced apart from the second friction wheel in the direction of the travel path.

10. The method according to claim 7 wherein at least one of the friction wheels is rotationally mounted at one end of a pivot lever, which pivot lever is pivotally mounted at another end fixed to the construction phase elevator car to rotate about a pivot axis, and wherein a center of the at least one friction wheel lies below the pivot axis when a periphery of the at least one friction wheel is applied to a guide surface of the at least one guide rail strand.

11. The method according to claim 10 including pressing the at least one friction wheel with a predetermined minimum pressing force against the guide surface by a spring.

12. The method according to claim 7 wherein at least one of the friction wheels is driven by an exclusively associated motor being an electric motor or a hydraulic motor and wherein the at least one friction wheel and the associated motor are arranged on a common axle.

13. The method according to claim 12 wherein the at least one guide rail strand has two opposed guide surfaces, wherein at least first and second ones of the friction wheels are pressed against one of the guide surfaces and at least a third one of the friction wheels is pressed against another of the guide surfaces, wherein each of the first, second and third friction wheels is arranged on a common axis with an exclusively associated electric motor, and wherein the common axes of the first and second friction wheels are offset along the travel path by approximately a diameter of the electric motor associated with the third friction wheel.

14. The method according to claim 7 including a single motor driving the friction wheels and providing torque transmission from the motor by a mechanical gear.

15. The method according to claim 14 wherein the mechanical gear includes at least one of a chain gear, a belt gear and a toothed wheel gear.

16. The method according to claim 7 including activating a holding brake during a standstill of the construction phase elevator car, the holding brake acting between the construction phase elevator car and the at least one guide rail strand when activated.

17. The method according to claim 16 including driving at least one of the friction wheels with a motor and reducing a torque transferred from the motor to the at least one friction wheel to a predetermined minimum value when the holding brake is activated.

18. The method according to claim 6 wherein at least one of the friction wheels is driven by a hydraulic motor, the hydraulic motor being fed by a hydraulic pump driven by an electric motor, and including feeding the electric motor from at least one frequency converter controlled by a control of the construction phase elevator system.

19. The method according to claim 1 wherein the primary part of the drive system is a primary part of an electric linear drive and the secondary part of the drive system is a secondary part of the electric linear drive fixed along the elevator shaft.

20. A method for erecting a final elevator installation in an elevator shaft of a building, the method comprising the steps of:

installing a construction phase elevator system in the elevator shaft for use during a construction phase of the building while the elevator shaft becomes higher with increasing building height, the construction phase elevator system including a self-propelled construction phase elevator car, and adapting a usable lifting height of the construction phase elevator car to an increasing height of the elevator shaft;

installing at least one guide rail strand in the elevator shaft for guiding the construction phase elevator car along a travel path in the elevator shaft;

assembling a drive system for driving the construction phase elevator car, the drive system including a primary part attached to the construction phase elevator car and a secondary part attached in the elevator shaft along the travel path;

wherein the primary part of the drive system includes a plurality of driven friction wheels, and including driving the construction phase elevator car along the travel path by an interaction of the friction wheels with the secondary part of the drive system attached in the elevator shaft, and wherein the at least one guide rail strand is included in the secondary part of the drive system;

extending the at least one guide rail strand and the secondary part of the drive system upward in the elevator shaft during the construction phase in accordance with the increasing elevator shaft height, wherein the construction phase elevator car is adapted to be used both for transporting persons and/or material for construction of the building and as a passenger and freight elevator for floors already used as residential or business premises during the construction phase of the building;

after the elevator shaft has reached a predetermined final height, removing the construction phase elevator system from the elevator shaft and installing a final elevator system in the elevator shaft which final elevator system is modified compared to the construction phase elevator system; and wherein the at least one guide rail strand has two opposed guide surfaces, wherein at least first and second ones of the friction wheels are pressed against one of the guide surfaces and at least a third one of the friction wheels is pressed against another of the guide surfaces, wherein each of the first, second and third friction wheels is arranged on a common axis with an exclusively associated electric motor, and wherein the common axes of the first and second friction wheels are offset along the travel path by approximately a diameter of the electric motor associated with the third friction wheel.

* * * * *